Sept. 15, 1964 P. B. BROWN ETAL 3,148,544
METHYL CHLORIDE ANALYZER PROBE
Filed April 26, 1961 2 Sheets-Sheet 1

INVENTORS
Parke B. Brown and
BY Edwin R. North
Stephen J. Rudy
Jerome Rudy Attys.

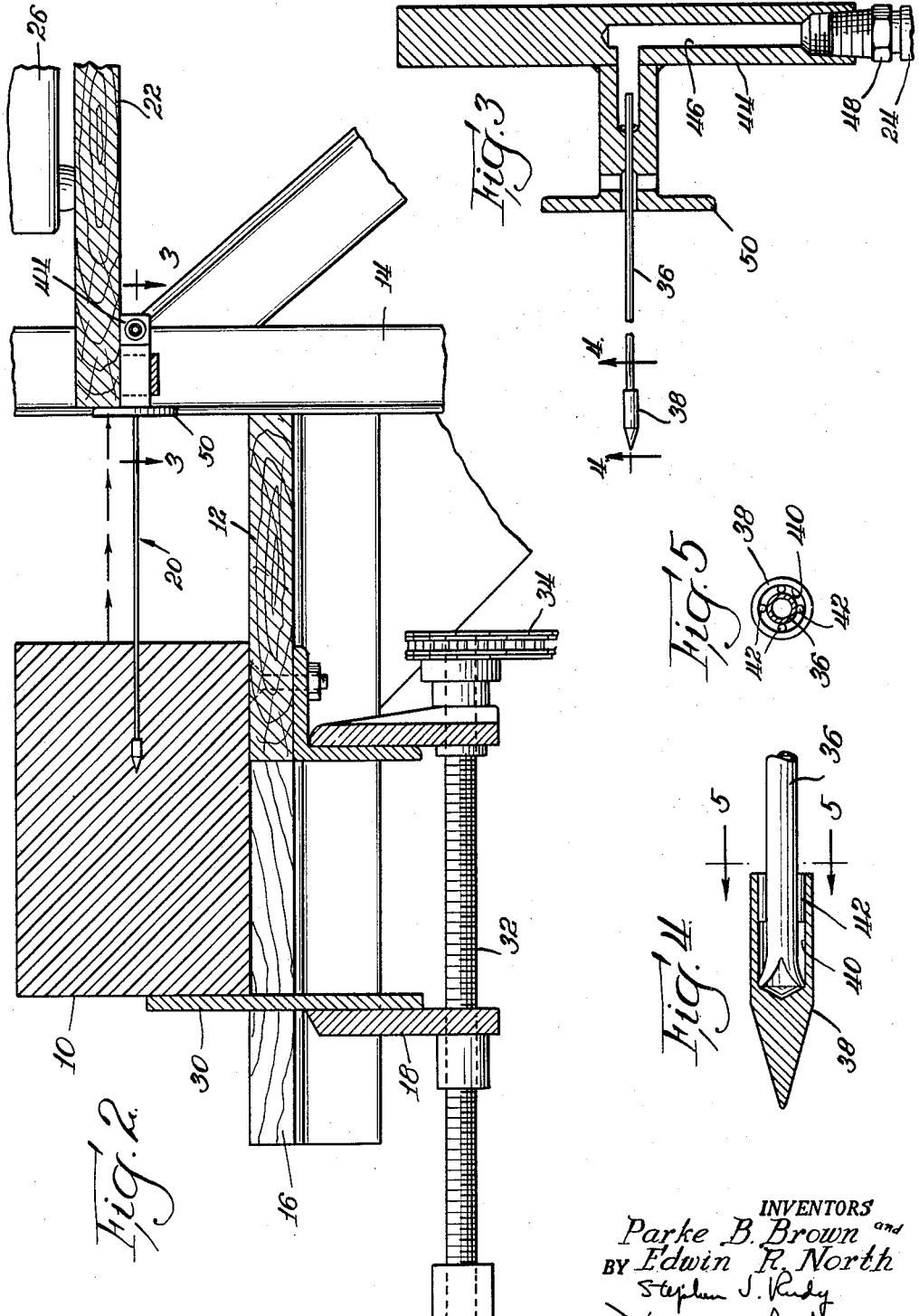

3,148,544
METHYL CHLORIDE ANALYZER PROBE
Parke B. Brown and Edwin R. North, Midland, Mich., assignors to The Dow Chemical Company, Midland, Mich., a corporation of Delaware
Filed Apr. 26, 1961, Ser. No. 105,636
2 Claims. (Cl. 73—421.5)

This invention relates to apparatus for determination of the amount of residual gas in foamed thermoplastic resins.

One of the problems in making foamed thermoplastic materials is the amount of gaseous blowing agent that remains trapped in the individual cells of the foam. If such gas is flammable or toxic, such as methyl chloride, critical amounts of gas in the foam constitutes a hazard when the foam is cut, shaped or otherwise handled. By storing the foam at room temperature and under atmospheric pressure, the gas slowly diffuses therefrom; when the gas content is thus reduced to desired level, the foam may be removed from storage. The apparatus of the present invention provides a convenient, and reliable means for determining the residual gas content of foamed thermoplastic resin, e.g., foamed polystyrene, polyethylene, polymethyl methacrylate, etc.

Briefly, the invention relates to the use of a clog-free probe which is inserted to different depths into a log, plank, or billet of a foamed thermoplastic material to withdraw samples of gas at different levels. The samples are analyzed by appropriate equipment to which the probe is connected. A prompt and accurate indication of gas content is thus conveniently obtained.

The main object of this invention is to provide apparatus for determination of the amount of residual gas in foamed thermoplastic resins.

Another object of the invention is to provide a means and method for the prompt and accurate determination of residual gas content of foamed thermoplastic resins in a convenient manner.

These and further objects and features of the invention will become more apparent from the following description and accompanying drawings wherein:

FIG. 2 is a vertical section view taken through a portion of the apparatus illustrated in FIG. 1, and showing the manner in which a gas sampling probe is inserted in a block of foamed thermoplastic resin;

FIG. 3 is a section view generally as seen along line 3—3 in FIG. 2;

FIG. 4 is an enlarged section view generally as seen along line 4—4 in FIG. 3; and FIG. 5 is a view generally as seen along line 5—5 in FIG. 4.

Figure 1:
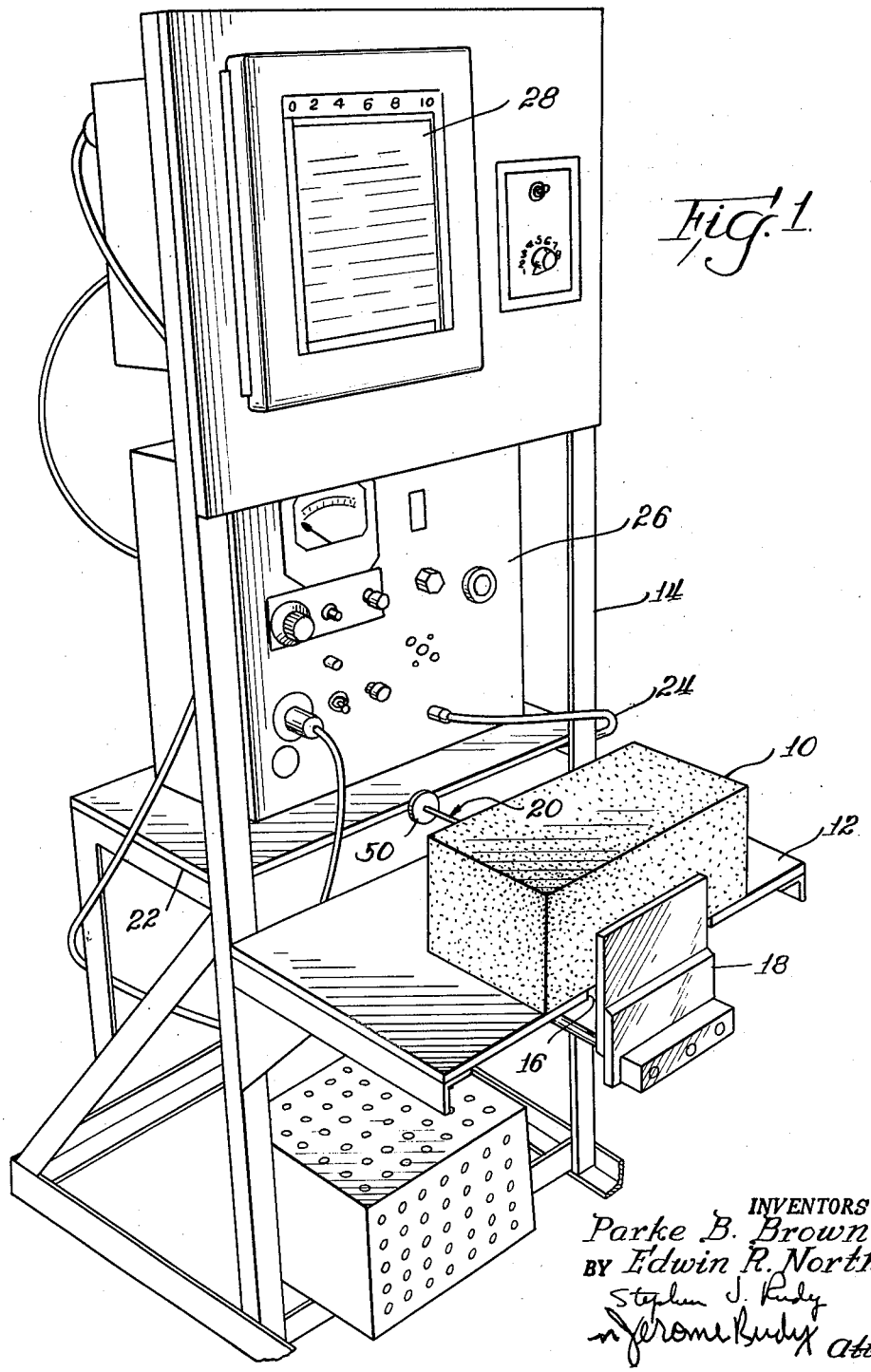
FIG. 1 is a perspective view showing an operational setup incorporating apparatus of the invention for determination of residual gas content of foamed thermoplastic resin.

Referring now to the drawings and more particularly to FIG. 1 numeral 10 identifies a block of foamed thermoplastic material, such as polystyrene, which is supported upon a front platform 12 affixed to a frame means 14. A slot 16 is formed in the platform, while a vise head 18 is supported for movement in the slot to force the block 10 toward the frame means 14. A probe 20 is arranged to project horizontally from a rear platform 22 affixed to the frame means 14, said probe being parallel with the line of movement of the vise head 18, and lying generally in a vertical plane coincident with the centerline of the slot 16. The probe is connected via a hose, or tube 24, to a meter 26 supported on the rear platform 22, which meter is of the type adapted to provide volumetric measurements of gases fed into it via the tube 24. By way of example, a Davis Halide meter, marketed by the Davis Emergency Equipment Company, may be used. A recorder 28, supported upon the frame means, is arranged for operating in conjunction with the meter for recording the measurements of the meter. The recorder 28, may be similar to a Leeds and Northrup "Speedomax," Model H, recorder.

As best seen in FIGS. 2 to 5, the vise head 18 includes a vertical extension 30 for engaging a side of the block 10. A screw 32, which is rotated by a motor driven chain 34, is adapted to move the head 18 into or out of the slot 16. The probe 20 is preferably formed of a straight 1/16" O.D. stainless steel tube 36, to which a cap-like pointed tip 38 is affixed at one end. The tip may be secured to the end of the tube 36 by cutting four longitudinal slots in the end of the tube and flaring the cut metal to provide a close fit within an axial bore 40 formed in the tip. Four wire spacers 42 are sweat in place at 90° spacing around the tube 36 and in engagement with the bore 40. In such manner, the end of the probe is adapted for easy insertion into a foamed thermoplastic material without clogging and/or obstructing flow of gas into the probe. The tube 36 is affixed to a handle 44 secured to the underside of the rear platform 22, said handle being formed with an internal passageway 46, the end of which is adapted to receive a pipe fitting 48 for the hose 24. A disc-like portion 50 is formed on the handle 44 at the end where the tube 36 is affixed, which serves as a buffer for the side of the block 10 should it be moved thereagainst.

In utilizing the above described apparatus for determination of residual gas in foamed thermoplastic resins, a sample size, i.e., block 10, at least 6" long in the direction of probing, is preferably used. Vise speed is controlled to move the block toward the probe at a constant rate of 6"/min. Before running a test, it is of course, necessary to calibrate the instruments, that is, the meter 26 and recorder 28, so that they will give a true reading of the particular residual gas content of the material being tested with a given probe. Such calibration procedure is well within the knowledge and skill of qualified laboratory technicians.

By way of specific example, a test was made with the above described apparatus, of a foamed thermoplastic resin made from a mobile gel consisting essentially of polystyrene having about 8 percent by weight methyl chloride uniformly dissolved therein, which gel was extruded through an orifice into the atmosphere wherein it was allowed to foam to a cellular bar of about 7 x 7 inches cross section. The foamed sample had a density of 1.8 pounds per cubic foot and was composed for the most part of individually-closed thin-walled cells having a diameter of 1.1 millimeters. Immediately after it was made, the foamed product was tested by the apparatus of the invention, and was found to contain 7.8 percent by weight of methyl chloride. The material from which the test sample was taken was stored for eight days at atmospheric pressure at a temperature of 140° F. A test on a sample of the aged foam product was made and found to contain only 1.2 percent by weight of methyl chloride.

From the foregoing it will be seen that the apparatus of the invention may be used to provide a prompt and accurate determination of residual gas content of a foamed thermoplastic resin.

The foregoing description has been given in detail without thought of limitation since the inventive principles involved are capable of assuming other forms without departing from the spirit of the invention or the scope of the following claims.

What is claimed is:

1. A clog-free probe for use in the determination of residual gas content in a body into which said probe is inserted comprising a tube with a flared slotted end and an unperforated cap-like pointed tip affixed over said end, the flare of said end providing a close fit with the tip.

2. A clog-free probe for use in the determination of residual gas content in a body of plastic foam into which said probe is inserted comprising a tube with a flared slotted end, an unperforated cap-like pointed tip affixed over said end, the flare of said end providing a close fit with the tip and spacers positioned radially about said tube and affixed rearwardly of said flared end between the body of said tube and the bore of said tip.

References Cited in the file of this patent

UNITED STATES PATENTS

| | | |
|---|---|---|
| 2,141,261 | Clark | Dec. 27, 1938 |
| 2,374,227 | Metcalf | Apr. 24, 1945 |
| 2,707,616 | Schad et al. | May 3, 1955 |
| 2,787,903 | Beard | Apr. 9, 1957 |
| 2,904,443 | Manns | Sept. 15, 1959 |

FOREIGN PATENTS

| | | |
|---|---|---|
| 717,229 | Great Britain | Oct. 20, 1954 |
| 1,126,023 | France | July 23, 1956 |